Figure 1:
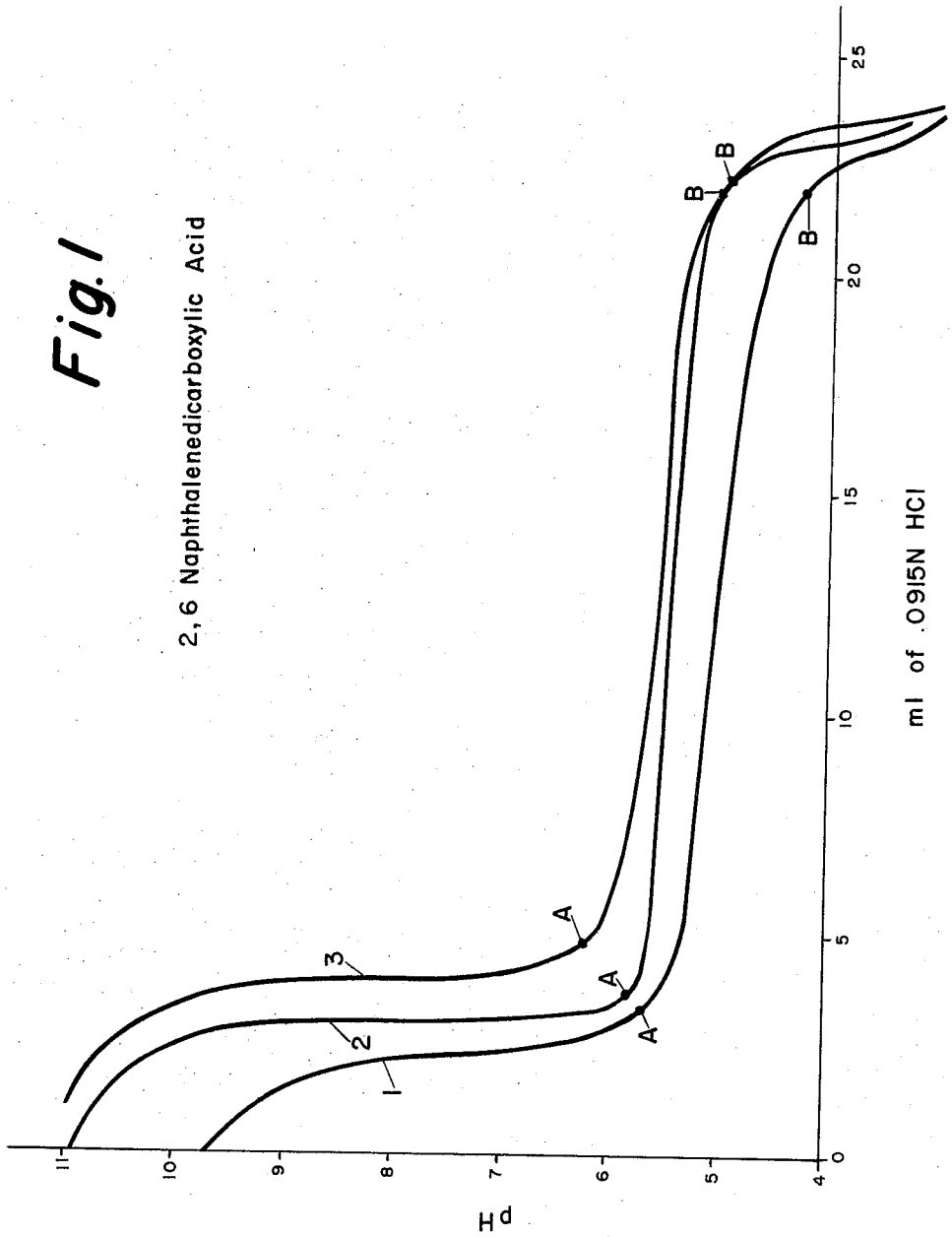

May 3, 1966 R. WYNKOOP 3,249,634
PURIFICATION OF NAPHTHALENEDICARBOXYLIC ACIDS
Filed May 28, 1962 4 Sheets-Sheet 4

INVENTOR:
RAYMOND WYNKOOP
BY George L. Church
ATTORNEY

United States Patent Office 3,249,634
Patented May 3, 1966

3,249,634
PURIFICATION OF NAPHTHALENEDI-
CARBOXYLIC ACIDS
Raymond Wynkoop, Gladwyne, Pa., assignor to Sun Oil
Company, Philadelphia, Pa., a corporation of New
Jersey
Filed May 28, 1962, Ser. No. 198,115
11 Claims. (Cl. 260—525)

This invention relates to the preparation of naphthalenedicarboxylic acids. In particular, this invention provides a means of improving the purity of impure naphthalene dicarboxylic acids obtained by partial oxidation of dimethylnaphthalenes.

Naphthalenedicarboxylic acid in which the carboxyl groups are located at the 2,6-positions is a highly desirable article of commerce, particularly in that it can be used for making polyester type resins which have outstandingly good properties for certain applications. This dicarboxylic acid can be obtained by liquid phase oxidation of 2,6-dimethylnaphthalene in several ways. One known procedure involves the use of molecular oxygen (e.g., air) at temperatures in the range of 100–250° C. while utilizing a catalyst system comprising a heavy metal oxidation catalyst and bromine or a bromine compound. This type of oxidation process has been described in Saffer et al. United States Patent 2,833,816. By way of example, 2,6-dimethylnaphthalene can be converted to the corresponding diacid by contacting an acetic acid solution of the dimethylnaphthalene containing a cobalt acetate-ammonium bromide co-catalyst with molecular oxygen at a temperature in the range of 110–135° C.

Another known procedure involves the use of potassium permanganate as the oxidizing agent. The procedure involves dissolving the 2,6-dimethylnaphthalene in an aqueous solution of potassium permanganate containing a small amount of sodium hydroxide. The mixture is heated until the purple color disappears, which indicates the end of the oxidation. Manganese dioxide ($MnO_2$) is precipitated by addition of sodium bisulfite and 2,6-naphthalenedicarboxylic acid is extracted from the remaining liquid phase with a solvent such as benzene or ethanol. This procedure is described in further detail in "Identification of Organic Compounds," Shriner & Fuson, page 198 (1948).

A particularly suitable procedure for converting 2,6-dimethylnaphthalene to 2,6-naphthalene dicarboxylic acid involves the use of nitrogen dioxide ($NO_2$) in combination with selenium. The procedure involves dissolving the 2,6-dimethylnaphthalene in an inert solvent such as trichlorobenzene, adding a small amount of selenium to the mixture, and contacting the mixture in liquid phase with gaseous $NO_2$ at a temperature above 140° C., preferably in the range of 180–230° C.

The procedures mentioned above for the 2,6-isomer can also be utilized to oxidize not only other single dimethylnaphthalene isomers to the corresponding dicarboxylic acid isomer, but to oxidize a mixture of dimethylnaphthalene isomers, such as can be obtained from cracked petroleum fractions, to a mixture of the corresponding dicarboxylic acid isomers. These other dicarboxylic acid isomers can then be converted to the 2,6-dicarboxylic acid isomer by the so-called Henkel reaction. In the Henkel reaction a dipotassium, dirubidium, or dicesium salt of a pure naphthalenedicarboxylic acid in which the carboxyl groups occur at other than the 2,6-positions is heated to a temperature in the range of 350–530° C. in the presence of a catalyst which is a salt or oxide of cadmium, zinc, or mercury and in a carbon dioxide atmosphere at a gauge pressure of 50–1500 p.s.i.g. This causes a shift in position of the carboxylate groups to the 2,6-positions. The rearrangement will occur regardless of whether the two carboxylate groups in the starting material are located on the same ring or on different rings.

The purity of the naphthalenedicarboxylic acids obtained by the oxidation of dimethylnaphthalenes is of considerable importance. An impure 2,6-naphthalenedicarboxylic acid will generally be unsuitable for applications such as making polyester type resins. In addition, an impure mixture of several isomers is an undesirable starting material for the Henkel reaction because the impurities often inhibit the reaction and result in abnormally low conversion to the 2,6-isomer.

Unfortunately, the purity of the naphthalenedicarboxylic acid obtained by the oxidation of dimethylnaphthalene is often considerably less than 100%. Purities as low as 75% are not uncommon. There are several reasoins for the low purity. One reason is that the oxidation itself is incomplete. Each methyl group of the dimethylnaphthalene may remain unoxidized, may be partially oxidized to an aldehyde group, or may be further oxidized to an acid group. These possibilities give rise to a variety of impurities which may be present in the naphthalenedicarboxylic acid. For example, in the oxidation of the 2,6-isomer the following impurities may be found in the 2,6-dicarboxylic acid.

2,6-dimethylnaphthalene
2-methyl-6-naphthaldehyde (2-methyl - 6 - naphthalenecarbonal)
2-methyl-6-naphthalenecarboxylic acid (2-methyl-6-naphthoic acid)
2,6-naphthalenedialdehyde (2,6 - naphthalenedicarbonal)
2-carbonal-6-naphthalenecarboxylic acid (2-carbonal-6-naphthoic acid) (2-formyl - 6 - naphthalenecarboxylic acid)

A second reason why impurities are present in the naphthalenedicarboxylic acid is the presence of impurities in the dimethylnaphthalene starting material. This starting material may also contain monomethylnaphthalenes and trimethylnaphthalenes. This also gives rise to a variety of impurities that may be present in the naphthalenedicarboxylic acid, which, in the case of the 2,6-isomer, may be impurities such as 2-naphthoic acid
2-naphthaldehyde
2-methylnaphthalene
1,2,6-trimethylnaphthalene
1 2,6-naphthalene tricarboxylic acid
1-carbonal-2,6-naphthalenedicarboxylic acid
1,2-dicarbonal-6-naphthalenecarboxylic acid A third explanation for the presence of impurities in the naphthalenedicarboxylic acid is the decomposition of the dimethylnaphthalene. This can result in the formation of various benzene compounds.

A fourth reason for the relatively low purities of the naphthalenedicarboxylic acid lies in the particular dimethylnaphthalene oxidation process employed. For example, if air is used to oxidize 2,6-dimethylnaphthalene, the impurities will be substantially as described above. Where, however, other oxidizing agents are used, there may be additional impurities. Thus if nitrous oxide is employed as the oxidizing agent with a selenium oxide catalyst, not only may the compounds described above be present, but various nitro derivatives of these compounds may also be formed.

Thus, it is seen that the impurities present in the naphthalenedicarboxylic acid obtained by the oxidation of dimethylnaphthalene cover a broad range of organic compounds. A method has now been found by which a substantial portion of these impurities can be separated from the naphthalenedicarboxylic acid. This method comprises the steps of dissolving the impure naphthalenedicarboxylic acid in aqueous sodium hydroxide, acidifying to an identifiable pH to precipitate impurities, separating the impurities, further acidifying to a second identifiable pH to precipitate naphthalenedicarboxylic acid of substantially higher purity than the impure diacid, and separating such substantially higher purity acid. The method is applicable to both a single impure isomer and an impure mixture of isomers.

The basis upon which such a selective separation can be made is as follows. In the following discussion the impure naphthalenedicarboxylic acid which is desired to be purified is referred to as the impure diacid. This acid, when a substantial improvement in purity has been made, is referred to as the purified diacid. The discussion is confined initially to the purification of a single impure diacid isomer, following which is a discussion of the purification of an impure mixture of isomers.

The impure diacid is substantially insoluble in water but is substantially soluble in a basic solution such as aqueous sodium hydroxide. If a solution of impure diacid in aqueous sodium hydroxide is acidified with hydrochloric acid from a pH of about 10 to a pH of about 3, two important results are found to occur. One is that a precipitate forms. If this precipitate is separated from the remaining liquid phase and analyzed, it will be found to contain both naphthalenedicarboxylic acid and also impurities. The purity of this precipitate will not be much different than the purity of the original impure diacid. Essentially what has taken place is that the impure diacid has been reprecipitated.

If, however, the precipitate is separated and analyzed at frequent intervals during the acidification, it will be found that the purity of the precipitate is not constant. The first precipitate obtained is of low purity, continued acidification precipitates material of high purity, and finally more low purity precipitate is obtained. This is apparent from the data presented in Table I which show the acid number of the precipitate obtained at various pH intervals during the acidification of an alkaline solution of an impure 2,6-naphthalenedicarboxylic acid obtained by the oxidation of 2,6-dimethylnaphthalene with nitric oxide in combination with selenium. Acid number is a common method of stating the purity of an acid. It is defined as the milligrams of potassium hydroxide required to neutralize one gram of the acid being analyzed. The theoretical acid number of the naphthalenedicarboxylic acid is 519. Hence as the acid number of a particular sample of naphthalenedicarboxylic acid approaches 519, the purity of the sample approaches 100%.

TABLE I

*Acid number of original impure 2,6-diacid=580*

| pH intervals: | Acid number of precipitate |
| --- | --- |
| 9.8–5.9 | 190 |
| 5.9–5.8 | 492 |
| 5.8–5.7 | 499 |
| 5.7–5.6 | 517 |
| 5.6–5.25 | 526 |
| 5.25–1.8 | 549 |

Figure 2:
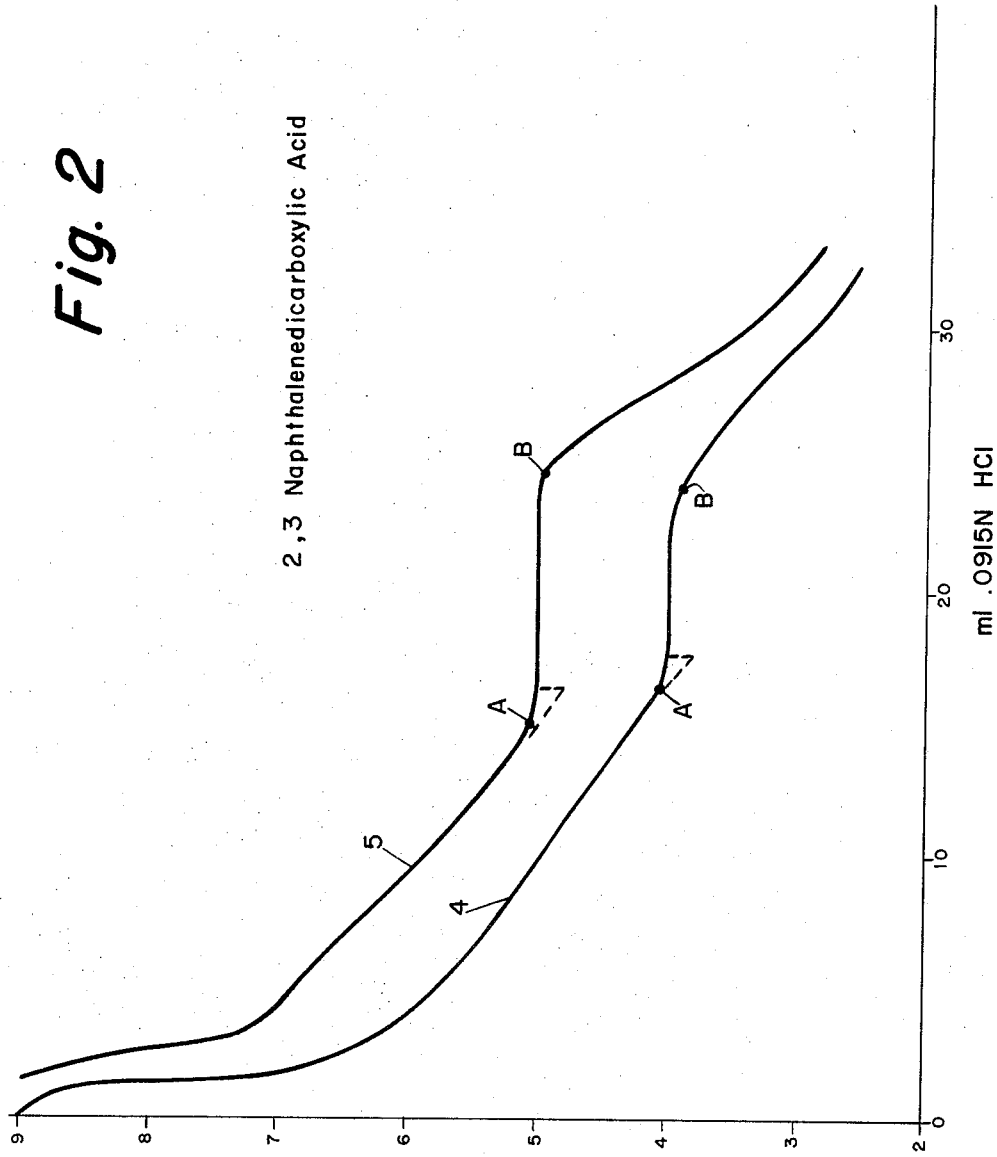

These data show that a purified diacid can be obtained by removing the precipitate at appropriate pH's. It is possible to determine in advance the pH region in which a purified diacid precipitates. This can be done as follows:

If a graph is prepared in which pH is plotted against the volume of acid added, a particular type of curve is obtained. This is apparent from FIGURES 1 and 2. In each of these graphs rectangular Cartesian coordinates with arithmetic scales are employed; pH is the ordinate, and the milliliters of .0915 Normal hydrochloric acid added is the abscissa. In each case the sample acidified was 0.25 gram of an impure diacid dissolved in 125 milliliters of 0.02 Normal sodium hydroxide. A graph prepared in this manner as illustrated in FIGURES 1 and 2 will hereinafter be referred to as the titration curve. In FIGURE 1 each sample was an impure 2,6-diacid, in FIGURE 2 each sample was an impure 2,3-diacid. Both the impure 2,6-diacids and the impure 2,3-diacids were obtained by the oxidation of the corresponding dimethylnaphthalene using the nitrogen dioxide-selenium process described hereinbefore. The three titration curves in FIGURE 1 are identified as titration curves 1, 2, and 3, the two titration curves in FIGURE 2 are identified as titration curves 4 and 5.

Each of the three titration curves in FIGURE 1 has similar characteristics and each of the two titration curves in FIGURE 2 has similar characteristics. In addition, there are some characteristics common to all five titration curves.

Considering first the three titration curves of FIGURE 1, it is apparent that initial acidification soon results in a relatively vertical curve, that is, the pH decreases relatively rapidly with addition of acid. For curve 2 this would be that portion of the titration curve between about pH 9.5 and pH 6.0, the latter corresponding to roughly 3 milliliters of acid added. Continued acidification results in a relatively horizontal curve, that is, the change in pH with addition of acid is relatively small. For titration curve 2 this would be that portion of the titration curve between about 4 milliliters and 22 milliliters on the abscissa. Still further acidification results in another relatively vertical curve. For titration curve 3 this would be the region beyond about 22 milliliters on the abscissa.

Considering now the two titration curves of FIGURE 2, it is apparent that initial acidification results in a relatively vertical curve. For titration curve 4 this would be that portion of the curve between about pH 8.5 and pH 6.5, the latter corresponding to about 2.5 milliliters on the abscissa. Continued acidification results in a relatively inclined curve. For titration curve 4 this would be that portion of the titration curve between about 4 milliliters and 17 milliliters on the abscissa. Continued acidification results in a relatively horizontal curve. For titration curve 4 this would be that portion of the titration curve between about 17 milliliters and 24 milliliters on the abscissa. Further acidification results in another relatively inclined curve which for titration curve 4 would be that portion of the titration curve between about 24 milliliters and 30 milliliters.

It is noted that each titration curve in FIGURE 1 and each titration curve in FIGURE 2 is not in exactly the same position in relation to the axis of the graph. That is, for the same diacid isomer, the relatively horizontal portion of one titration curve may be offset 0.1–1.0 pH units from the relatively horizontal portion of the titration curve obtained from another impure diacid. This variation, which can be due to variations in the composition of the impure diacid, is unimportant for present purposes since all titration curves for the same isomer have the same general over-all shape.

Considering all five titration curves together, it is apparent that each titration curve has a relatively horizontal portion. While the length of the relatively horizontal portion may vary, it will be found that there is a relatively horizontal portion on the titration curves of each of the naphthalenedicarboxylic acid isomers.

It will be found that purified diacid precipitates over the relatively horizontal portion of all the titration curves. Impurities precipitate before and after the relatively horizontal portion of the curve. Therefore, if the precipitate present at the beginning of the relatively horizontal portion of the titration curve is removed, the precipitate present at the end of the relatively horizontal portion of the titration curve is purified diacid.

One noticeable difference between the titration curves of FIGURE 1 and those of FIGURE 2 is that the length of the horizontal portion of the curves in FIGURE 1 is roughly twice the length of the horizontal portion of the titration curves in FIGURE 2. The reason for this difference is as follows. As acid is added to an aqueous solution of the disodium salt of a naphthalenedicarboxylic acid, the sodium ions are replaced by hydrogen ions. For some of the naphthalenedicarboxylic acid isomers, such as the 2,3-isomer, all of the disodium salt must be converted to the monosodium salt before precipitation of diacid occurs. Thus one half of the theoretical amount of acid must be added before any diacid precipitation occurs. For other naphthalenedicarboxylic acid isomers, such as the 2,6-isomer, precipitation of diacid occurs immediately and continues until the theoretical amount of acid has been added. Thus while the amount of acid theoretically required to replace all the sodium ions is the same in either case, the rate of diacid precipitation will not be the same for all isomers. Consequently, the length of the relatively horizontal portion of the curve will not be the same for all isomers.

It is impossible to specify in advance the exact pH range over which the purified diacid precipitates because, as described above, for a given diacid isomer the relatively horizontal portion of the titration curve will vary slightly with different impure diacids. It is possible, however, to identify the range over which purified diacid precipitates in terms of the mathematical slope of the curve. As used herein slope has its usual mathematical definition, namely:

The slope of a curve at a given point is the slope of the line tangent to the curve at that point. The slope of a line is the tangent of the angle formed by the abscissa and the line. The slope of a straight line is positive when an increase along the abscissa causes an increase along the ordinate and is negative when an increase along the abscissa causes a decrease along the ordinate.

Figure 3:
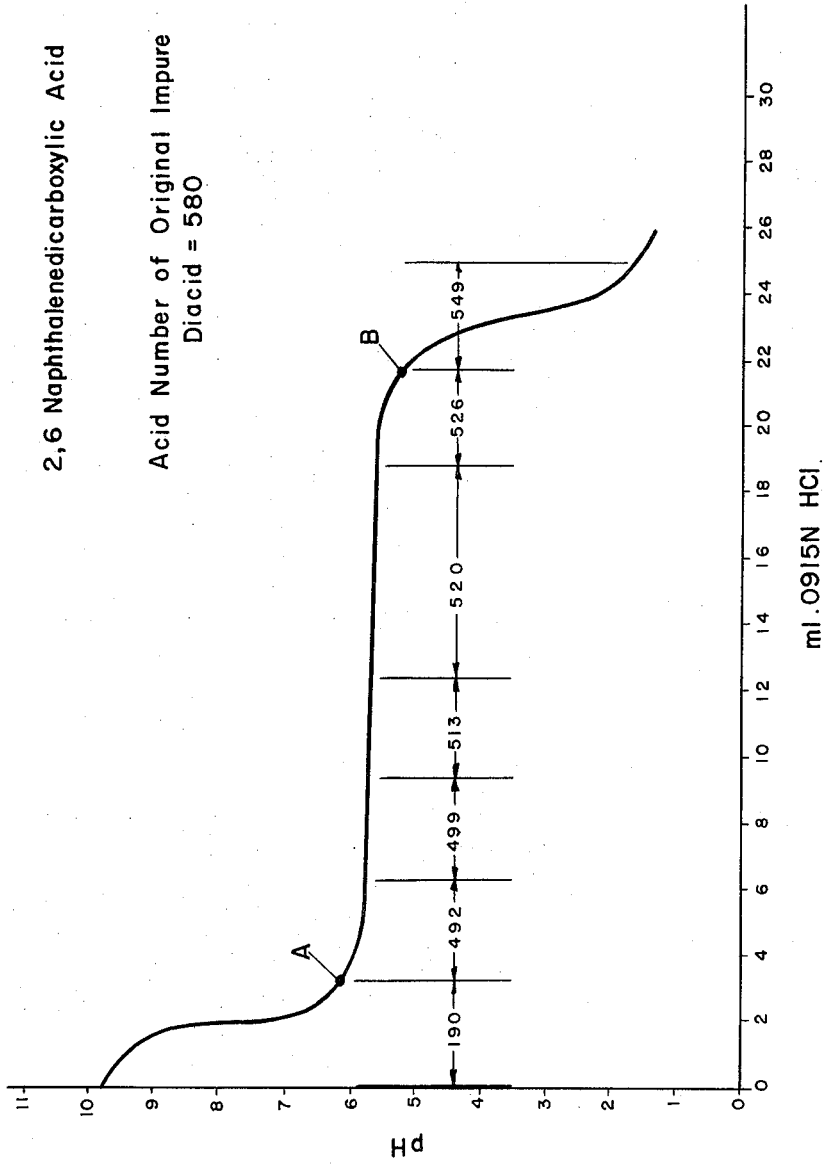

Consider first the titration curves of FIGURE 1. Near each end of the relatively horizontal portion of each curve there is a point at which the slope of the curve is minus 0.4. Between these two points on the titration curve purified diacid precipitates. This is shown in FIGURE 3 which is a graph similar to the graphs of FIGURE 1 except that the acid numbers of various precipitates along the titration curve are also shown. It can be seen that the purity of the precipitate obtained between these two points of minus 0.4 slope is a substantial improvement over the purity of the original impure diacid. These points of minus 0.4 slope are identified in FIGURES 1 and 3 as points A and B. These points are capable of easy and rapid determination with an ordinary triangle and straight edge. The pH's corresponding to point A and B are pH–A and pH–B respectively.

For curves as illustrated in FIGURE 1 point A can be identified as the first point on the titration curve less than pH 7.0 at which the slope of the titration curve is minus 0.4. Point B is the last point on the titration curve greater than pH 3.0 at which the slope of the titration curve is minus 0.4. First and last are used herein with reference to movement along the titration curve in the direction of decreasing pH. There may in some cases be points on the titration curve higher than pH 7.0 or less than pH 3.0, at which the slope of the curve is minus 0.4. Such a point exists on titration curve 3 at a pH of about 10.7. Points higher than pH 7.0 or less than pH 3.0 at which the slope of the titration curve is minus 0.4 have no special significance for the purposes of this invention.

Considering now the titration curves of FIGURE 2, it is apparent that the rate of change of slope just before and just after the relatively horizontal portion of the titration curve is considerably less than was the case with the titration curves in FIGURE 1. In other words, the titration curves of FIGURE 1 have sharper curves at the ends of the horizontal portion than do the titration curves of FIGURE 2. For titration curves such as those of FIGURE 2, purified diacid precipitates between the points near each end of the horizontal portion of the curve at which the slope is minus 0.1. These points of minus 0.1 slope are also identified in FIGURE 2 as points A and B. For this type of titration curve point A can be identified as the first point of the titration curve less than pH 7.0 at which the slope of the titration curve is minus 0.1, point B is the last point on the titration curve greater than pH 3.0 at which the slope of the titration curve is minus 0.1, where first and last are again used in reference to movement along the titration curve in the direction of describing pH. pH–A and pH–B are again the pH's corresponding to points A and B respectively.

For either titration curve, whether it be of the type shown in FIGURE 1 or of the type shown in FIGURE 2, a flat portion of said titration curve is defined as any continuous portion of the titration curve between pH 7.0 and pH 3.0, the first and last points of which have a slope of minus 0.1 and the slope of all intermediate points is not less than minus 0.1

It has already been seen that the material precipitating between points A and B on either type of titration curve is a purified diacid. In many cases it will be considered sufficient to separate all of this precipitate together. When this is done impurities are removed at point A, the remaining liquid phase is acidified to point B, and purified diacid is then separated. On the other hand, it can be seen from FIGURE 3 that even within the over-all range of point A to point B, the precipitate will vary in purity. Thus in FIGURE 3 one relatively narrow range between points A and B represents precipitate with an acid number of 520, which is very close to a purity of 100%. In some cases it will be desirable to separate this heart cut of maximum purity. Actually, any number of separations can be made between points A and B.

It has also been found that an impure mixture of naphthalenedicarboxylic acids can be separated so as to obtain a purified mixture of diacids or so as to obtain the purified diacids individually.

Figure 4:
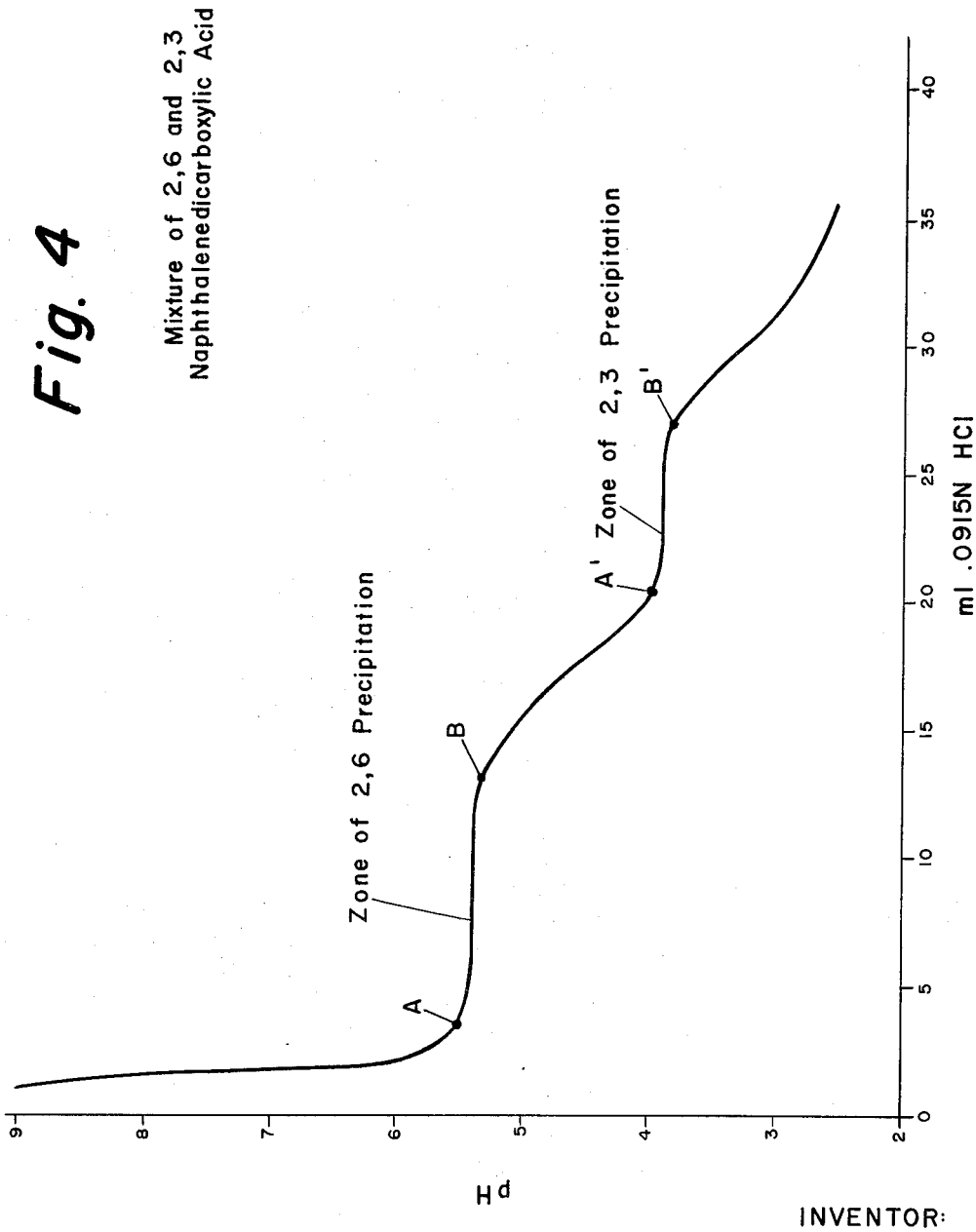

FIGURE 4 shows the titration curve for a mixture containing equal amounts of the 2,3-diacid and the 2,6-diacid, both prepared by oxidation of the corresponding dimethylnaphthalene using nitric oxide in combination with selenium as previously described. Initial acidification results in a relatively vertical curve. Further acidification results in a relatively horizontal curve followed by a relatively inclined curve. Still further acidification results in another relatively horizontal curve followed finally by another relatively inclined curve.

It will be found that purified 2,6-diacid precipitates over the first relatively horizontal portion of the titration curve and purified 2,3-diacid precipitates over the second relatively horizontal portion of the titration curve. Points A, B, A′, and B′ identify flat portions of the titration curve as hereinbefore defined, that is, points A and A′ are the points near the left-hand end of the relatively horizontal portions of the curve at which the slope of the curve is minus 0.1. Points B and B′ are the points near the right-hand end of the relatively horizontal portions of the titration curve at which the slope of the titration curve is minus 0.1.

With reference to FIGURE 4 is can be seen that several types of separations can be made from an impure mixture of diacids. If a purified mixture of diacids is desired, impurities are removed at point A and the remaining liquid phase is acidified to point B′. At B′ the precipitate will be a mixture of purified 2,6-diacid and purified 2,3-diacid. If it is desired to isolate the purified acids separately, impurities are removed at point A, the remaining liquid phase is acidified to point B where purified 2,6-diacid is separated. The liquid phase remaining after this latter separation is acidified to point A′ where any impurities are separated and the remaining liquid phase is acidified to point B′ where purified 2,3-diacid is separated. If desired one or more heart cuts can be separated between points A and B'. Actually any number of separations can be made between points A and B'.

Where the impure diacid mixture contains more than two diacid isomers, the purified diacids or a mixture thereof can be separated in substantially the same manner. There will be a flat portion of the titration curve as hereinbefore defined for each isomer. By separating the material that precipitates over each flat portion the purified diacids are isolated separately. By separating the material that precipitates from the beginning of the first flat portion until the end of the last flat portion, a mixture of purified diacids is obtained.

The performance of this invention in actual practice is best described in the following manner. In the following description it will be assumed that the material to be purified is an impure 2,6-diacid.

The titration curve will normally be determined first. This is most conveniently done in the laboratory in laboratory size equipment. A 0.25 gram sample of the impure diacid to be processed is obtained, dissolved in 125 milliliters of 0.02 Normal sodium hydroxide, and slowly acidified with .0915 Normal hydrochloric acid. The pH of the solution and the volume of acid added are determined at frequent intervals, preferably about every milliliter, and a titration curve as hereinbefore described is prepared. Once the titration curve is prepared, the points of minus 0.4 slope, points A and B as hereinbefore described, are readily ascertainable by means of a triangle and straight edge. The pH's corresponding to points A and B are the pH's at which the initial and final separation of precipitate will usually be made. If it is desired to precipitate a heart cut between points A and B, the precipitate is removed at frequent intervals during the laboratory determination of the titration curve and the acid number of each separated precipitate is obtained. Knowing the acid numbers the pH range over which the heart cut precipitates can be determined from the titration curve without difficulty.

Several precautions should be mentioned in connection with this preliminary determination of the titration curve. Care should be taken to insure that the 0.25 gram sample is representative of the entire quantity of impure diacid to be ultimately processed. In addition, care should also be taken to insure that the hydrochloric acid-impure diacid solution is of uniform composition before any pH's are determined. If the composition is not uniform the pH's will not be reliable.

In making this laboratory titration it may be found that the hydrochloric acid-impure diacid solution reaches equilibrium rather slowly. After a portion of acid is added the pH may not remain constant for 5–10 minutes, even with vigorous agitation. This is especially true in the area on the titration curve just prior to diacid precipitation. In this area, when a portion of acid is added, the pH drops and initially appears to remain constant. However, in the next 5–10 minutes, the pH may rise 0.1–0.4 units before finally remaining constant. This delayed equilibrium is akin to a temporary supersaturation. It is shown in titration curves 4 and 5 by a dotted line. In summary, any pH should be checked for accuracy by waiting 5–10 minutes and taking another reading. If the two pH's are the same, they are accepted as the true pH. If they are not the same, agitation is continued until the pH does remain constant.

Equilibrium can be achieved more rapidly by heating the hydrochloric acid-impure diacid mixture, but this must be done with caution because the solubility of the various diacid isomers at a given elevated temperature varies considerably. The 2,6-isomer is substantially insoluble at temperatures as high as 80–85° C., hence the titration can be carried out at this elevated temperature. On the other hand, the 2,3-isomer has a substantial solubility at 80–85° C. so that it is inadvisable to carry out the titration at this elevated temperature. It is impossible to specify the maximum permissible temperature because the impure diacid may be a mixture containing up to ten individual isomers. However, the preferred procedure is to carry out the titrations at about room temperature, for at this temperature all of the isomers are substantially insoluble.

The precautions mentioned above should be observed not only in the preliminary determination of the titration curve but also in the subsequent processing of the entire lot of impure diacid.

Having determined the pH's at which the precipitate is to be removed, the actual processing of the entire lot of impure diacid can be started.

The impure diacid is first contacted with sufficient aqueous base to dissolve the impure diacid. Sodium hydroxide is preferred because of its relatively low cost, but other inorganic bases in which the impure diacid is soluble can also be used. Thus potassium hydroxide and lithium hydroxide can be used. The amount and strength of the base used will depend of course on the amount of impure acid being processed. It will be found that a pH of about 6.7–7.0 is usually required in order to dissolve the impure diacid. The preferred method is to have sufficient aqueous base present to maintain the pH at about 9–10. This small excess of base insures maximum solution of the impure diacid. Use of a larger excess of base is wasteful, not only of base itself but also of acid, since substantially all base added will eventually be neutralized.

In dissolving the impure diacid in aqueous base, it may be found that approximately 1–3% of the impure diacid remains undissolved. If this happens, it should cause no concern for it does not detract from the successful operation of this invention. This undissolved material will be removed in a subsequent step of the process with other impurities. As used in this specification "dissolving" and "solution" are intended to include the situation where a small amount of material remains undissolved.

The dissolving operation can be done in conventional equipment as either a batch operation or as a continuous operation. The simplest and preferred procedure is to add the impure diacid to a tank containing the aqueous base solution. Preferably the tank is equipped with an agitator in order to increase the solution rate and also to improve the accuracy of pH determinations.

When the impure diacid is substantially dissolved in aqueous base, it can next be acidified to the predetermined pH at which the initial separation of precipiate is to be made. This pH, as has been described previously, will usually be pH–A. Any inorganic acid can be used, such as hydrochloric, sulfuric, and the like, but hydrochloric acid is preferred. The strength of the acid can vary over a wide range and will depend primarily on the quantity of material being acidified. The acid is added in any convenient manner but care should be taken not to add too much acid and thus overshoot the desired pH.

When the desired pH has been reached, the precipitate present is removed. Conventional methods of separating solids from liquids, such as centrifugation and filtration, can be used.

The remaining liquid phase can then be acidified to the predetermined pH at which the separation of the purified diacid is to be made. This pH, as has been previously described, will usually be pH–B. Any convenient means of adding the acid can be used. When this pH has been reached, the precipitate, which is the purified diacid, is separated from the liquid phase. Here again any conventional method of separating the precipitate can be used.

Again it should be noted that any number of separations can be made between pH–A and pH–B. If only a heart cut is desired, the precipitate will be separated at the two pH's previously determined to be the range over which the heart cut precipitates. In some cases it may be desirable to recover not only a heart cut but also the remainder of the purified diacid that precipitates between pH–A and pH–B. In such a case impurities are separated at pH–A, a purified diacid is separated at the beginning of the heart cut pH range, the heart cut is separated at the end of the heart cut pH range, and finally more purified diacid is separated at pH–B.

I claim:
1. Method of preparing purified naphthalenedicarboxylic acid comprising the steps of adding mineral acid to an aqueous solution of an alkali metal disalt of impure naphthalendicarboxylic acid obtained by partial oxidation of dimethylnaphthalene until a pH is reached which is at least as low as pH–A but which is at least as high as pH–B, separating insoluble matter from the acid treated mixture, adding a further portion of mineral acid until another pH is attained which is lower than said reached pH but which is at least as high as pH–B, whereby precipitation of purified naphthalenedicarboxylic acid is effected, and separating the purified naphthalenedicarboxylic acid from the aqueous phase, wherein
   (a) pH–A is the pH corresponding to the first point on a flat portion of the titration curve for said impure naphthalenedicarboxylic acid,
   (b) pH–B is the pH corresponding to the last point on the same flat portion of the titration curve for said impure naphthalenedicarboxylic acid,
   (c) said titration curve is the graph obtained by acidifying 0.25 gram of said impure naphthalene dicarboxylic acid dissolved in 125 milliliters of 0.02 Normal sodium hydroxide with .0915 Normal hydrochloric acid and plotting on Cartesian coordinates having arithmetic scales pH as the ordinate and milliliters of .0915 Normal hydrochloric acid added as the abscissa, and
   (d) a flat portion of the titration curve is any continuous portion of the titration curve between pH 7.0 and pH 3.0 the first and last points of which have a slope of minus 0.1 and the slope of all intermediate points is not less than minus 0.1.

2. The method of claim 1 in which the impure naphthalenedicarboxylic acid contains the 2,3-isomer.

3. The method of claim 1 in which the pH reached is about pH–A and the pH attained is about pH–B.

4. Method of preparing a purified naphthalenedicarboxylic acid comprising the steps of adding mineral acid to an aqueous solution of an alkali metal disalt of an impure naphthalenedicarboxylic acid obtained by the partial oxidation of dimethylnaphthalene, wherein said impure naphthalenedicarboxylic acid contains more than one isomer, until a pH is reached which is at least as low as pH–A but which is higher than pH–B, separating insoluble matter from the acid treated mixture, adding a further portion of mineral acid until a pH is attained which is lower than said reachd pH and which is also at least as low as pH–A', and at least as high as pH–B', whereby precipitation of purified naphthalenedicarboxylic acid is effected, and separating the purified naphthalenedicarboxylic acid from the aqueous phase, wherein
   (a) pH–A and pH–B are the pH's corresponding to the first and last points respectively on a flat portion of the titration curve for said impure naphthalenedicarboxylic acid,
   (b) pH–A' and pH–B' are the pH's corresponding to the first and last points respectively on any other flat portion of the titration curve for said impure naphthalenedicarboxylic acid,
   (c) pH's A' and B' are each less than both pH–A and pH–B,
   (d) said titration curve is the graph obtained by acidifying 0.25 gram of said impure naphthalene dicarboxylic acid dissolved in 125 milliliters of 0.02 Normal sodium hydroxide with .0915 Normal hydrochloric acid and plotting on Cartesian coordinates having arithmetic scales pH as the ordinate and milliliters of .0915 Normal hydrochloric acid added as the abscissa, and
   (e) a flat portion of the titration curve is any continuous portion of the titration curve between pH 7.0 and pH 3.0 the first and last points of which have a slope of minus 0.1 and the slope of all intermediate points is not less than minus 0.1.

5. The method of claim 4 in which the isomers present in the impure naphthalenedicarboxylic acid are the 2,3- and the 2,6-isomers.

6. Method of claim 4 in which the pH reached is about pH–A and the pH attained is about pH–B'.

7. Method of preparing purified 2,6-naphthalenedicarboxylic acid comprising the steps of adding mineral acid to an aqueous solution of an alkali metal disalt of impure 2,6-naphthalenedicarboxylic acid obtained by partial oxidation of 2,6-dimethylnaphthalene until a pH is reached which is at least as low as pH–A but which is at least as high as pH–B, separating insoluble matter, adding a further portion of mineral acid until another pH is attained which is lower than said reached pH but which is at least as high as pH–B, whereby precipitation of purified 2,6-naphthalenedicarboxylic acid is effected, and separating the purified 2,6-naphthalenedicarboxylic acid from the aqueous phase, wherein
   (a) pH–A is the pH corresponding to the first point on the titration curve for said impure 2,6-naphthalenedicarboxylic acid less than pH–7 at which the slope of the titration curve is minus 0.4,
   (b) pH–B is the pH corresponding to the last point on the titration curve for said impure 2,6-naphthalenedicarboxylic acid greater than pH–3 at which the slope of the titration curve is minus 0.4, and
   (c) said titration curve is the graph obtained by acidifying 0.25 gram of said impure naphthalene dicarboxylic acid dissolved in 125 milliliters of 0.02 Normal sodium hydroxide with .0915 Normal hydrochloric acid and plotting on Cartesian coordinates having arithmetic scales pH as the ordinate and milliliters of .0915 Normal hydrochloric acid added as the abscissa.

8. The method of claim 7 in which the pH reached is about pH–A and in which the pH attained is about pH–B.

9. Method of preparing purified naphthalenedicarboxylic acid comprising the steps of (1) adding mineral acid to an aqueous solution of an alkali metal disalt of an impure naphthalenedicarboxylic acid obtained by the partial oxidation of dimethylnaphthalene, wherein said impure naphthalenedicarboxylic acid contains more than one isomer, until a pH is reached which is at least as low as pH–A but which is at least as high as pH–B, separating insoluble matter from the acid treated mixture, adding a further portion of mineral acid until another pH is attained which is lower than said reached pH but which is at least as high as pH–B, whereby precipitation of a purified naphthalenedicarboxylic acid isomer is effected, separating the purified naphthalenedicarboxylic acid from the remaining aqueous phase, and (2) adding a further quantity of mineral acid to said remaining aqueous phase until a pH is reached which is lower than the pH's reached and attained in (1) and which is at least as low as pH–A' but which is at least as high as pH–B', separating insoluble matter from the acid treated remaining aqueous phase, adding a further portion of mineral acid until a pH is attained which is lower than the pH reached in (2) but which is at least as high as pH–B', whereby precipitation of a purified naphthalenedicarboxylic acid isomer different from the isomer precipitated in (1) is effected, and separating the purified naphthalenedicarboxylic acid isomer from the aqueous phase wherein
   (a) pH–A and pH–B are the pH's corresponding to the first and last points, respectively, on a flat portion of the titration curve for said impure naphthalenedicarboxylic acid,
   (b) pH–A' and pH–B' are the pH's corresponding to the first and last points, respectively, on any other flat portion of the titration curve for said impure naphthalenedicarboxylic acid, (c) pH's A' and B' are each less than both pH–A and pH–B,
(d) said titration curve is the graph obtained by acidifying 0.25 gram of said impure naphthalene dicarboxylic acid dissolved in 125 milliliters of 0.02 Normal sodium hydroxide with .0915 Normal hydrochloric acid and plotting on Cartesian coordinates having arithmetic scales pH as the ordinate and milliliters of .0915 Normal hydrochloric acid added as the abscissa, and
(e) a flat portion of the titration curve is any continuous portion of the titration curve between pH 7.0 and pH 3.0 the first and last points of which have a slope of minus 0.1 and the slope of all intermediate points is not less than minus 0.1.

10. Method according to claim 9 wherein the pH reached and the pH attained in (1) are about pH–A and about pH–B, respectively, and wherein the pH reached and the pH attained in (2) are about pH–A' and pH–B', respectively.

11. The method of claim 9 in which the isomers present in the impure naphthalenedicarboxylic acid are the 2,3- and the 2,6-isomers.

References Cited by the Examiner
UNITED STATES PATENTS

| | | | |
|---|---|---|---|
| 1,770,393 | 7/1930 | Daniels | 260—525 |
| 1,822,016 | 9/1931 | Daniels | 260—525 |
| 1,945,246 | 1/1934 | Witzel | 260—525 |
| 2,336,364 | 12/1943 | Migrdichian | 260—525 |
| 2,833,816 | 5/1958 | Saffer et al. | 260—524 |
| 2,849,482 | 8/1958 | Raecke et al. | 260—525 X |
| 2,906,774 | 9/1959 | Raecke et al. | 260—525 X |
| 2,927,130 | 3/1960 | Shutt | 260—525 |

LORRAINE A. WEINBERGER, *Primary Examiner.*

LEON ZITVER, *Examiner.*

M. S. JAROSZ, S. B. WILLIAMS, *Assistant Examiners.*